(12) United States Patent
Govindan Kannan et al.

(10) Patent No.: US 11,533,362 B1
(45) Date of Patent: Dec. 20, 2022

(54) NETWORK INTERFACE CONTROLLER AWARE PLACEMENT OF VIRTUALIZED WORKLOADS

(71) Applicant: International Business Machines Corporation, Armonk, NY (US)

(72) Inventors: Pravein Govindan Kannan, Bangalore (IN); Priyanka Prakash Naik, Mumbai (IN); Praveen Jayachandran, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/539,809

(22) Filed: Dec. 1, 2021

(51) Int. Cl.
*G06F 15/16* (2006.01)
*H04L 67/10* (2022.01)
*H04L 43/08* (2022.01)

(52) U.S. Cl.
CPC .............. *H04L 67/10* (2013.01); *H04L 43/08* (2013.01)

(58) Field of Classification Search
CPC ................................ H04L 67/10; H04L 43/08
See application file for complete search history.

(56) References Cited

U.S. PATENT DOCUMENTS

| 10,489,215 | B1* | 11/2019 | Wen ..................... G06F 11/3442 |
| 2011/0090911 | A1 | 4/2011 | Hao et al. |
| 2018/0077080 | A1* | 3/2018 | Gazier ................ H04L 41/0897 |
| 2018/0081715 | A1* | 3/2018 | LeBeane ................ G06F 9/505 |
| 2019/0140933 | A1 | 5/2019 | Guim Bernat et al. |
| 2020/0278892 | A1 | 9/2020 | Nainar et al. |
| 2021/0058316 | A1* | 2/2021 | Kommula ............... H04L 45/24 |

FOREIGN PATENT DOCUMENTS

WO 2020068725 A1 4/2020

OTHER PUBLICATIONS

G. Miott et al., "Adaptive Placement & Chaining of Virtual Network Functions with NFV-PEAR," Journal of Internet Services and Applications, vol. 10, No. 1, Feb. 4, 2019, 64 pages.
B. Stephens et al., "Loom: Flexible and Efficient NIC Packet Scheduling," Proceedings of the 16th USENIX Symposium on Networked Systems Design and Implementation, Feb. 26-28, 2019, 14 pages.

(Continued)

*Primary Examiner* — Padma Mundur
(74) *Attorney, Agent, or Firm* — Daniel Yeates; Ryan, Mason & Lewis, LLP

(57) ABSTRACT

A computer program product comprises a computer readable storage medium having program instructions embodied therewith. The program instructions are executable by one or more processors to cause the one or more processors to collect, at a network interface controller associated with a first node, a set of usage metrics from one or more other network interface controllers respectively associated with one or more other nodes. Further, the program instructions are executable by one or more processors to cause the one or more processors to select, at the network interface controller associated with the first node, one of the one or more other nodes to allocate a virtualized workload for execution, wherein the selection utilizes at least a portion of the set of usage metrics collected from each of the one or more other network interface controllers.

20 Claims, 15 Drawing Sheets

(56) References Cited

OTHER PUBLICATIONS

A. Sivaraman et al., "Programmable Packet Scheduling at Line Rate," SIGCOMM '16, Aug. 22-26, 2016, pp. 44-57.
M. Liu et al., "E3: Energy-Efficient Microservices on SmartNIC-Accelerated Servers," Proceedings of the 2019 USENIX Annual Technical Conference, Jul. 10-12, 2019, pp. 363-378.
M. Liu et al., "Offloading Distributed Applications onto SmartNICs Using iPipe," SIGCOMM '19, Aug. 19-23, 2019, 16 pages.
Y. Le et al., "UNO: Unifying Host and Smart NIC Offload for Flexible Packet Processing," Symposium on Cloud Computing, Sep. 24-27, 2017, pp. 506-519.
R. Shah et al., "TurboEPC: Leveraging Dataplane Programmability to Accelerate the Mobile Packet Core," Symposium on SDN Research, Mar. 3, 2020, 13 pages.
F. Paolucci et al., "Enhancing 5G SDN/NFV Edge with P4 Data Plane Programmability," IEEE Network, May/Jun. 2021, pp. 154-160.
P. Mell et al., "The NIST Definition of Cloud Computing," Recommendations of the National Institute of Standards and Technology, Special Publication 800-145, Sep. 2011, 7 pages.
G. Siracusano et al., "TCP Proxy Bypass: All the Gain with No Pain!" SIGCOMM Posters and Demos '17: Proceedings of the SIGCOMM Posters and Demos, Aug. 22-24, 2017, pp. 88-90.
Y. Zhang et al., "Network-Assisted Raft Consensus Algorithm," SIGCOMM Posters and Demos '17: Proceedings of the SIGCOMM Posters and Demos, Aug. 22-24, 2017, pp. 94-96.
H. Giesen et al., "In-network Computing to the Rescue of Faulty Links," NetCompute '18: Proceedings of the 2018 Morning Workshop on In-Network Computing, Aug. 20, 2018, pp. 1-6.
B. Pismenny et al., "Autonomous NIC Offloads," ACM International Conference on Architectural Support for Programming Languages and Operating Systems, Apr. 19-23, 2021, 4 pages.
K. Taranov et al., "sRDMA—Efficient NIC-based Authentication and Encryption for Remote Direct Memory Access," 2020 USENIX Annual Technical Conference, Jul. 15-17, 2020, pp. 691-704.
X. Jin et al., "NetCache: Balancing Key-Value Stores with Fast In-Network Caching," SOSP '17: Proceedings of the 26th Symposium on Operating Systems Principles, Oct. 28, 2017, 16 pages.
X. Li et al., "Be Fast, Cheap and in Control with SwitchKV," Proceedings of the 13th USENIX Symposium on Networked Systems Design and Implementation, Mar. 16-18, 2016, pp. 31-44.
Y. Moon et al., "AccelTCP: Accelerating Network Applications with Stateful TCP Offloading," 17th USENIX Symposium on Networked Systems Design and Implementation, Feb. 25-27, 2020, 16 pages.
A. Sapio et al., "Scaling Distributed Machine Learning with In-Network Aggregation," Proceedings of the 18th USENIX Symposium on Networked Systems Design and Implementation, Apr. 12-14, 2021, pp. 785-808.
D. Firestone et al., "Azure Accelerated Networking: SmartNICs in the Public Cloud," Proceedings of the 15th USENIX Symposium on Networked Systems Design and Implementation, Apr. 9-11, 2018, pp. 51-64.
X. Jin et al., "NetChain: Scale-Free Sub-RTT Coordination," Proceedings of the 15th USENIX Symposium on Networked Systems Design and Implementation (NSDI), Apr. 9-11, 2018, pp. 35-49.
R. Joshi et al., "TimerTasks: Towards Time-Driven Execution in Programmable Dataplanes," SIGCOMM Posters and Demos '19: Proceedings of the ACM SIGCOMM 2019 Conference Posters and Demos, Aug. 19-23, 2019, pp. 69-71.
T. Benson et al., "Network Traffic Characteristics of Data Centers in the Wild," Internet Measurement Conference (IMC), Nov. 1-3, 2010, 14 pages.

* cited by examiner

820

>
Flow classified as long flow by default
IF pkt_count < Threshold$_{COUNT}$ :
    Classify as short/sensitive flow;
ELSE:
    ipg = Time$_{NOW}$ − timestamp
    IF ipg < Threshold$_{ipg}$ :
        Classify as short/sensitive flow;
IF flow is high priority :
    Classify as short/sensitive flow;

FIG. 8B

NETWORK INTERFACE CONTROLLER AWARE PLACEMENT OF VIRTUALIZED WORKLOADS

BACKGROUND

Telecommunications technology has developed in recent years wherein telecommunication services are performed in a network provider's core network with so-called network functions (NFs). Each NF provides some type of defined network functionality. While NFs were originally considered hardware-based proprietary devices, recent telecommunications developments, for example, fifth generation (5G) technology, partitions services into a series of virtualized NFs (VNFs) comprised of software executing on a common physical infrastructure. By way of example only, an access and mobility-management function or AMF is provided by a VNF that is configured to assist in managing user equipment (UE) access and mobility with respect to the core network. Such VNFs have been deployed on cloud architectures comprised of commodity processors such as central processing units (CPUs). This advancement has made traditional NFs easier to deploy and program, giving rise to tremendous innovation.

However, an end to Moore's law has been recently observed with network speeds becoming faster than processor speeds. Hence, software-based network functions are becoming bottlenecks in terms of throughput and latency as more VNFs are being deployed. This issue is amplified in the case of 5G deployments which have strict performance requirements to enable ultra-reliable low-latency communication for critical applications such as, but not limited to, remote surgery and autonomous vehicles.

SUMMARY

Embodiments of the invention provide network interface controller-based techniques for managing placement of a virtualized workload on a node of an information processing system for execution.

In one illustrative embodiment, a computer program product comprises a computer readable storage medium having program instructions embodied therewith. The program instructions are executable by one or more processors to cause the one or more processors to collect, at a network interface controller associated with a first node, a set of usage metrics from one or more other network interface controllers respectively associated with one or more other nodes. Further, the program instructions are executable by one or more processors to cause the one or more processors to select, at the network interface controller associated with the first node, one of the one or more other nodes to allocate a virtualized workload for execution, wherein the selection utilizes at least a portion of the set of usage metrics collected from each of the one or more other network interface controllers.

By way of example only, the virtualized workload can comprise executable software code that performs part or all of the functionality of a virtualized network function, and the node can be one of the nodes of a cloud infrastructure. However, alternative embodiments contemplate other types of virtualized workloads and nodes.

Further illustrative embodiments are provided in the form of a computer-implemented method comprising one or more steps. Still further illustrative embodiments comprise at least one processing device comprising a processor coupled to a memory, the at least one processing device, when executing program code, is configured to perform one or more operations.

These and other features and advantages of embodiments described herein will become more apparent from the accompanying drawings and the following detailed description.

BRIEF DESCRIPTION OF THE DRAWINGS

FIGS. 8A-8D illustrate further details of the scheduling methodology of FIG. 7.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass a wide variety of processing system, by way of example only, processing systems comprising cloud computing and storage systems as well as other types of processing systems comprising various combinations of physical and/or virtual processing resources.

Figure 1:
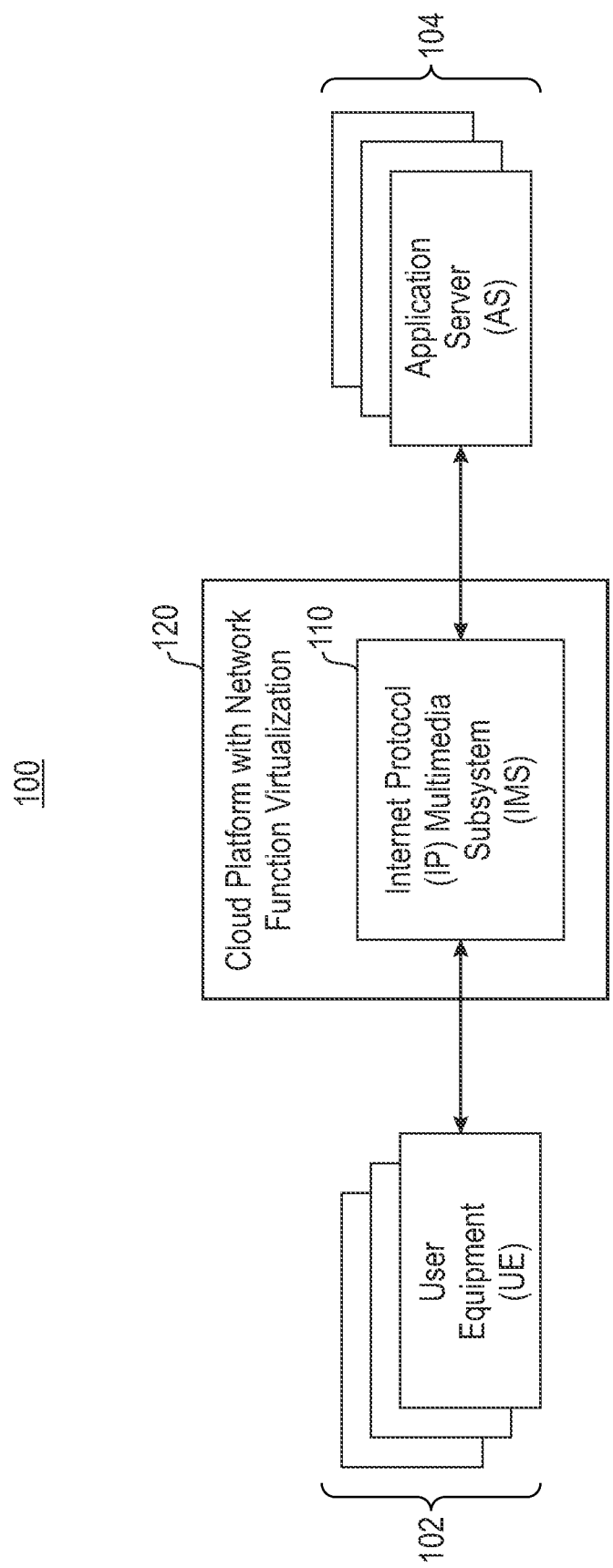
FIG. 1 illustrates an information processing system environment with a telecommunications network implemented on a cloud platform according to an illustrative embodiment.

As mentioned, telecommunications-based VNFs can be deployed on cloud architectures comprised of commodity processors such as CPUs. FIG. 1 illustrates an example of an information processing system environment 100 with a telecommunications network implemented on a cloud platform. More particularly, as shown, a telecommunications network in the form of an Internet Protocol (IP) multimedia subsystem or IMS 110 is implemented on a cloud platform 120 which has network function virtualization capabilities, e.g., a hypervisor layer (not expressly shown) that enables logical processing devices such as containers and/or virtual machines (VMs) to be instantiated and executed. That is, it is assumed IMS 110 is functionally executed using a plurality of VNFs that are executed on a plurality of nodes of the cloud platform 120. One or more user devices referred to as user equipment (UE) 102 and one or more application servers (AS) 104 are operatively coupled to IMS 110 as shown. In a typical data and/or communication session, a UE 102 interacts with an AS 104, and/or another UE 102, through IMS 110.

In one non-limiting example, IMS 110 can be an IMS core such as the open-source IMS core commercially available from Metaswitch Networks (London, United Kingdom). Such an IMS core utilizes VNFs running on nodes of a cloud network to provide both voice and short message service (SMS) telecommunications functionalities.

Figure 2:
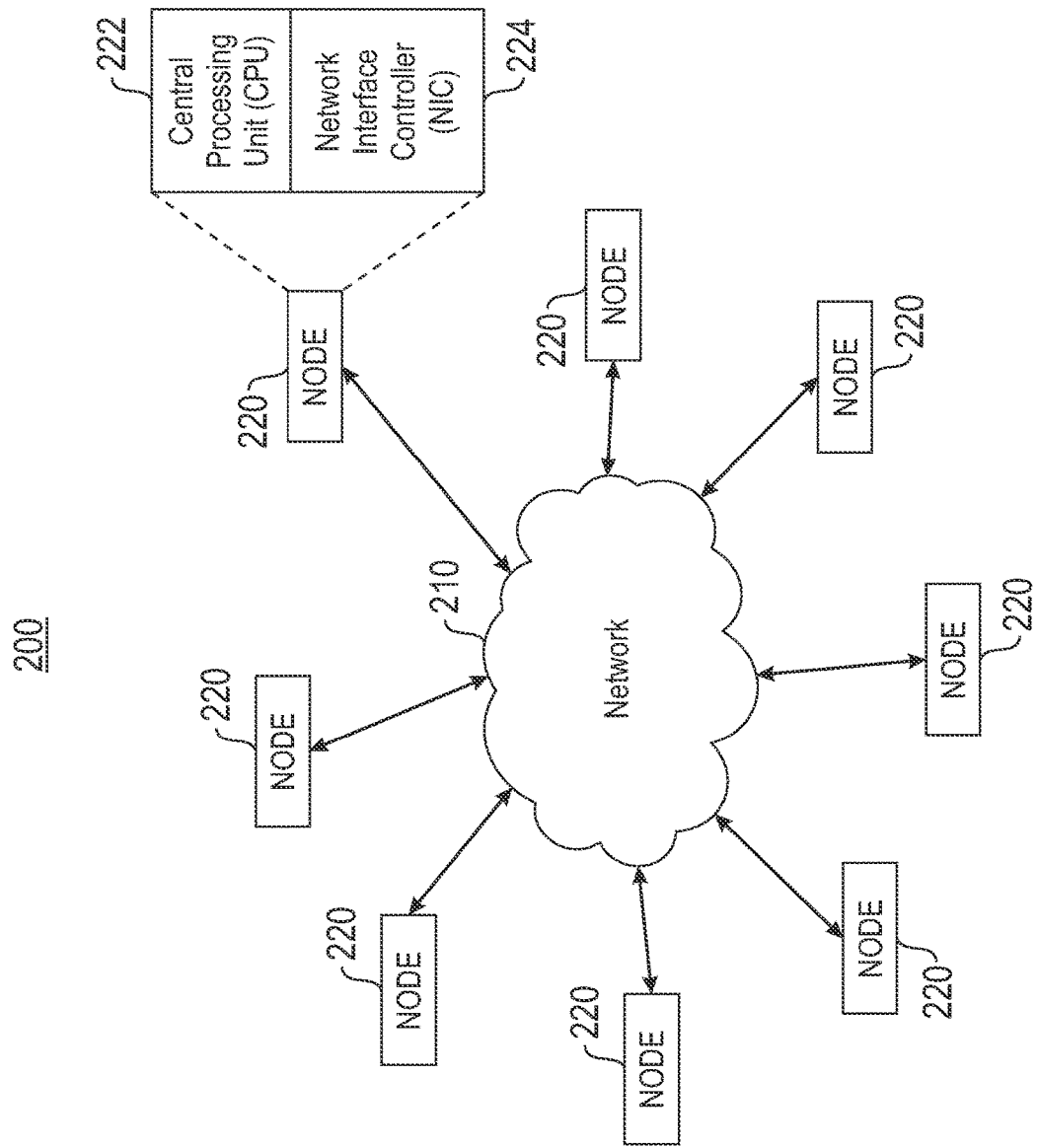
FIG. 2 illustrates a cloud platform according to an illustrative embodiment.

FIG. 2 illustrates an architecture 200 of cloud platform 120, for example, a communications network 210 operatively coupling a plurality of nodes 220. Each node 220 may comprise at least one CPU 222 and at least one network interface controller (NIC) 224. In cloud network 210, one or more nodes 220 may be implemented on a host device, e.g., a server or some other computing device, as part of a data center or some other information processing system managed by a cloud infrastructure provider. Furthermore, in a virtualization implementation using logical processing devices such as VMs and/or containers, each node 220 may represent a functional node such as a "worker node" or some other functional node such as a "scheduler node." In illustrative embodiments, it is assumed that at least a part of, or an entire, VNF is executed on a given worker node, while scheduling decisions (e.g., which worker node will execute which VNF) are made by a scheduler node. In some illustrative container-based embodiments, nodes 220 may be part of a Kubernetes framework wherein a plurality of worker nodes form a cluster, and one or more virtualized workloads are executed as one or more pods in the worker nodes. The scheduler node can be part of a management node or another worker node in the Kubernetes framework.

However, it is realized that software-based switching and networking functions are becoming bottlenecks in terms of throughput and latency as more VNFs are deployed on a network such as cloud network 210. This is a more significant issue in telecommunication deployments, e.g., IMS 110, which have strict performance requirements for critical applications, e.g., ultra-reliable low-latency communication in remote surgeries and autonomous vehicles.

Illustrative embodiments realize that programmable networks in the form of data-plane programmable switches and so-called smart-NICs (e.g., NICs capable of performing operations beyond simple network interface functionality) provide the ability for new applications with stateful processing that can be performed at line-rate and low latencies in the data-plane of these devices. Several cloud providers have deployed devices with smart-NICs from vendors such as Intel (N3000s), Mellanox, Xilinx, and Pensando, to name a few. Illustrative embodiments provide further enhancements to smart-NIC utilization by offloading latency-sensitive VNFs on to smart-NICs in a cloud computing architecture. More particularly, illustrative embodiments accomplish this and other advantages by providing a smart-NIC aware orchestration platform which can leverage the offload capabilities of smart-NICs. By way of example only, the term "offload" in this context illustratively refers to the act of relieving the CPU in a cloud node from performing some processing functions, such that the NIC in the same or another node performs the processing function rather than the CPU.

Figure 3:
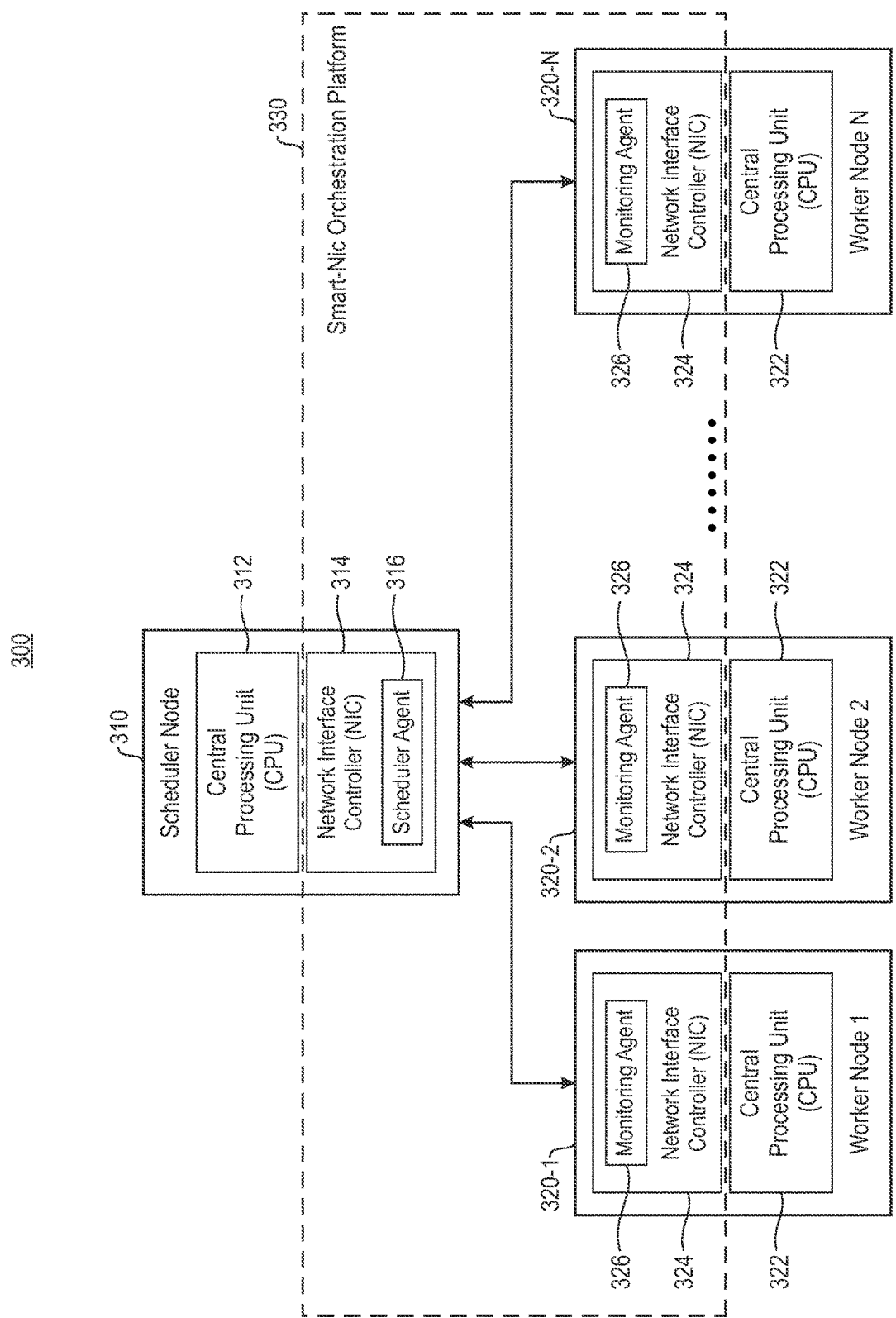
FIG. 3 illustrates a network interface controller-based orchestration architecture for managing placement of virtualized workloads according to an illustrative embodiment.

FIG. 3 illustrates an information processing system 300 with a network interface controller-based orchestration architecture for managing placement of virtualized workloads according to an illustrative embodiment. More particularly, as shown, information processing system 300 comprises a set of nodes including a scheduler node 310 and a plurality of worker nodes 320-1, 320-2, . . . , 320-N (referred to herein individually as worker node 320 or collectively as worker nodes 320). Recall that as described above in the context of FIG. 2, a given node 220 in cloud platform 210 may execute as a worker node or a scheduler node and includes a CPU 222 and NIC 224. Note that, in one or more illustrative embodiments, any given node can be configured to function as a scheduler node and/or a worker node depending on the deployment. A given worker node 320 executes one or more virtualized workloads (e.g., software code executable in a container/VM execution environment) that comprise part of or an entire VNF. Scheduler node 310 manages which worker nodes 320 execute which virtualized workloads in response to incoming requests. Each of worker nodes 320 have a CPU 322 and NIC 324, while scheduler node 320 similarly has a CPU 312 and NIC 314.

It is to be appreciated that the term "virtualized workload" as illustratively used herein includes, but is not limited to, telecommunication/5G network functions executed in VMs (vNFs), network functions executed in containers (cNFs), and more generally network functions executed in any suitable manner (xNFs). Embodiments are also not limited to 5G network functions but are more generally applicable to other telecommunication architectures (e.g., 4G, LTE, etc.). However, it is also to be appreciated that virtualized workloads as used herein, according to illustrative embodiments, can be or otherwise include workloads that are not related to telecommunications.

As further shown in FIG. 3, NIC 314 comprises a scheduler agent 316 while each of NICs 324 comprise a monitoring agent 326. Each of NIC 314 and 324 may be considered a smart-NIC. Collectively, NIC 314 and NICs 324 comprise a smart-NIC orchestration platform 330. As will be further explained below, smart-NIC orchestration platform 330 is configured to, inter alia, schedule VNFs (virtualized workloads) based on network insights and leverage smart-NICs in order to minimize VNF latency.

Figure 4:
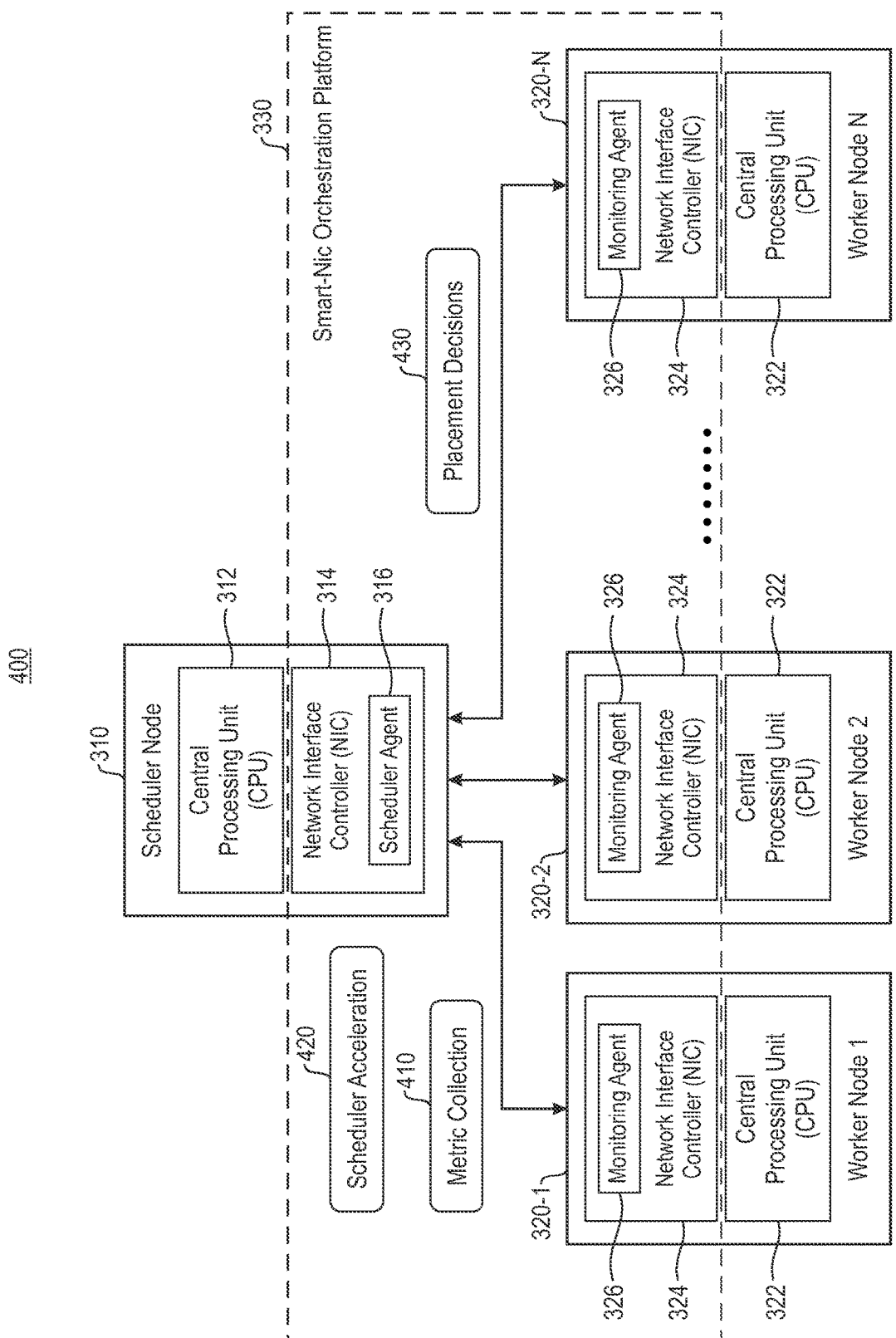
FIG. 4 illustrates a network interface controller-based orchestration methodology for managing placement of virtualized workloads according to an illustrative embodiment.

FIG. 4 illustrates a network interface controller-based orchestration methodology 400 for managing placement of virtualized workloads according to an illustrative embodiment. FIG. 4 illustrates the information processing system 300 of FIG. 3 and depicts the main steps of methodology 400 including metric collection 410, scheduler acceleration 420 and placement decisions 430, which will be further explained in detail below.

In general, methodology 400 comprises each monitoring agent 326 computing a set of metrics that are collected by scheduler agent 316 (metric collection 410). Scheduler agent 316 then performs scheduling acceleration operations (scheduler acceleration 420) using the collected metrics to make decisions as to where (i.e., which worker node 320) each virtualized workload or VNF is to be placed, i.e., assigned and forwarded, for execution (placement decisions 430). Thus, methodology 400 is managed by smart-NIC orchestration platform 330.

Figure 5:
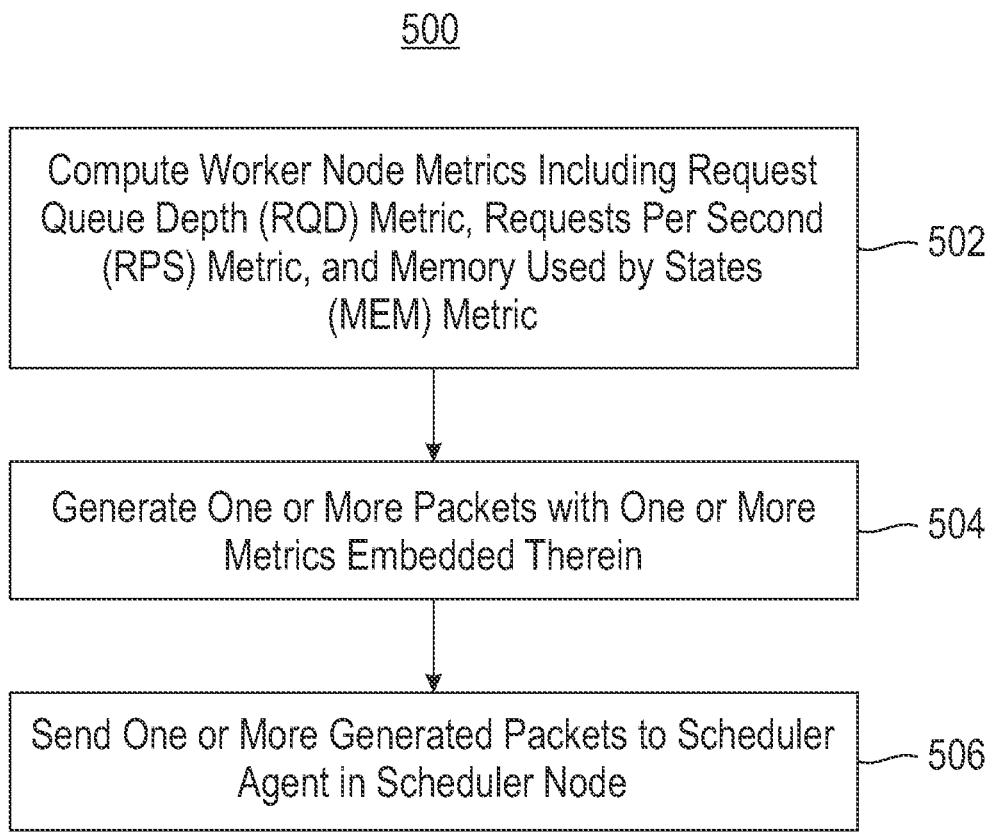
FIG. 5 illustrates a monitoring methodology for a network interface controller-based orchestration architecture for managing placement of virtualized workloads according to an illustrative embodiment.

FIG. 5 illustrates a monitoring methodology 500 for a network interface controller-based orchestration architecture for managing placement of virtualized workloads according to an illustrative embodiment. More particularly, in illustrative embodiments, monitoring methodology 500 can be executed by each monitoring agent 326 within NIC 324 of a worker node 320 of FIG. 3, and can be considered a metric computation part of metric collection 410 of FIG. 4.

As shown, step 502 computes a set of usage metrics including, as will be further explained, a request queue depth (RQD) metric, a requests per second (RPS) metric, and a memory used by states (MEM) metric. It is to be appreciated that the usage metrics are based on requests that the worker node 320 receives from scheduler node 310. A request corresponds to a traffic flow associated with a virtualized workload.

Recall that in an illustrative embodiment wherein VNFs are executed by worker nodes 320, each worker node 320 receives an execution request along with a virtualized workload to be executed. The RQD metric reflects a count of request arrivals and request fulfillments associated with a request queue, e.g., embodied by one or more counters/registers in a smart-NIC such as NIC 324 leveraged by monitoring agent 326. In one illustrative embodiment, the RQD metric is incremented for each new request arrival and decremented upon each existing request fulfillment.

The RPS metric reflects how quickly requests are processed wherein monitoring agent 326 leverages precision timers available within a smart-NIC such as NIC 324. More particularly, monitoring agent 326 calculates an instantaneous inter-request gap or IRG equal to the difference between the current time of a new request and the fulfillment of the previous request (IRG=$Time_{Now}$-$Time_{out\_prevRequest}$). Monitoring agent 326 then calculates an exponentially weighted moving average (EWMA) of RPS as RPS=$\alpha\times$ RPS+$(1-\alpha)\times(1/IRG)$, where $\alpha$ may be an alpha value associated with a request arrival queue.

The MEM metric reflects how much memory is used by states of a stateful workload during execution wherein monitoring agent 326 uses application programming interfaces (APIs) of a smart NIC such as NIC 324 to import and evict states.

Then, as shown in step 504, monitoring agent 326 generates one or more packets with one or more of the above-described metrics embedded therein, and sends the one or more packets to scheduler agent 316 in NIC 314 of scheduler node 310 in step 506.

Figure 6:
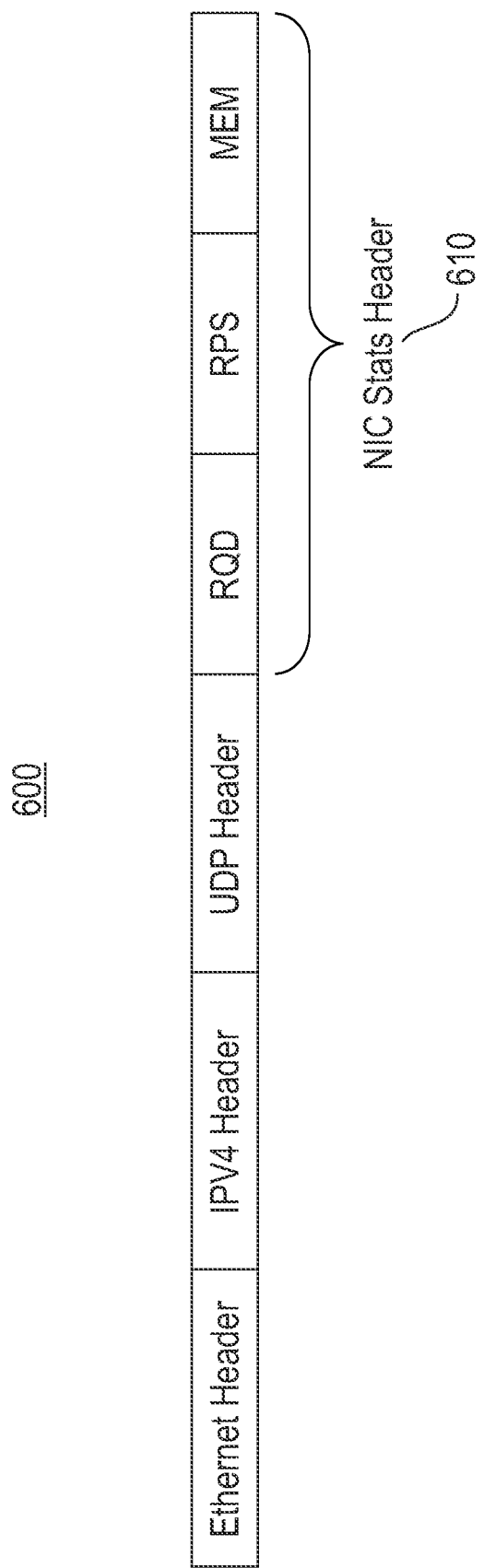
FIG. 6 illustrates an exemplary packet format associated with the monitoring methodology of FIG. 5.

In some illustrative embodiments, as shown in a packet header format 600 of FIG. 6, the RQD, RPS and MEM metrics (or some subset thereof) can be inserted as part of a separate header 610 along with other headers in a packet. By way of one example only, each usage metric (RQD, RPS and MEM) can be four bytes and be accommodated within a minimum Ethernet frame size (e.g., 64 bytes) along with other headers such as the Ethernet, IPV4 and UDP headers and payloads. Since monitoring agent 326 of NIC 324 is configured to compute these metrics without CPU 322 intervention, the metrics can be computed and sent to scheduler agent 316 every few milliseconds depending on the link speeds between nodes.

Figure 7:
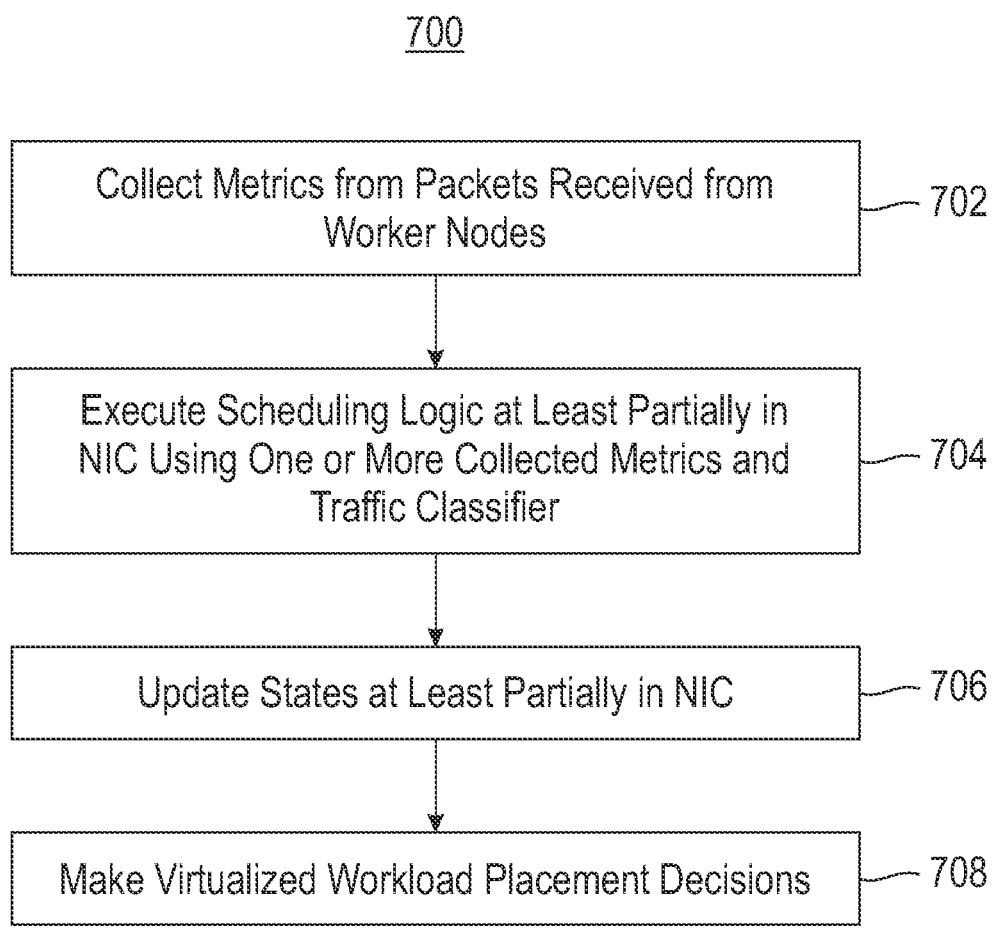
FIG. 7 illustrates a scheduling methodology for a network interface controller-based orchestration architecture for managing placement of virtualized workloads according to an illustrative embodiment.

Turning now to FIG. 7, a scheduling methodology 700 for a network interface controller-based orchestration architecture for managing placement of virtualized workloads is illustrated according to an illustrative embodiment. More particularly, in illustrative embodiments, scheduling methodology 700 can be executed, at least in part, by each scheduler agent 316 within NIC 314 of scheduler node 310 of FIG. 3 and can be considered part of scheduler acceleration 420/placement decisions 430 of FIG. 4.

It is to be understood that scheduler agent 316 receives requests for execution of virtualized workloads from one or more applications running on information processing system 300. These requests have to be assigned to worker nodes 320 for execution in a manner that satisfies acceptable/required response times of the one or more applications that issue the requests. Recall that when the applications are part of a time-critical function (e.g., remote surgery, autonomous vehicle), network throughput and latency are closely scrutinized. Thus, for example, objectives of the scheduling methodology 700 executed in accordance with scheduler agent 316 can include, but are not limited to, minimizing latency and round trip time (RTT) for a request, prioritization of critical applications such as ultra-reliable low latency communication (URLLC), and maximize NIC utilization to ensure the ability to redirect requests at scale.

Thus, as generally shown in FIG. 7, step 702 of scheduling methodology 700 collects the usage metrics from packets received from monitoring agents 326 of NICs 324 of worker nodes 320. Step 704 then executes scheduling logic at least partially in NIC 314 (as will be explained, certain request traffic can be scheduled by CPU 312) using one or more of the collected usage metrics and a traffic classifier, as will be further explained. Step 706 updates states at least partially in NIC 314. Illustrative embodiments realize that most VNFs in a 5G implementation have a central data-store and, therefore, can be stateless. States can therefore be imported when needed and stored in NIC 314 using static random access memory (SRAM). Thus, using NIC 314 to import states serves to bypass network latency and bandwidth bottleneck conditions. This is important as it is realized that Internet traffic flows tend to be highly skewed with a large number of relatively small traffic flows. Placement decisions for the requests for executing virtualized workloads associated with the traffic flows are then made in step 708.

Furthermore, as will be further explained below, scheduler agent 316 maintains a sorted list for eligible worker node NICs 324 that have capacity to process a request, wherein the list is sorted based on an estimated queueing time (EQT) metric computed by scheduler agent 316 from usage metrics RQD and RPS received from each worker node NIC 324. More particularly, in one illustrative embodiment, for each worker node NIC 324, EQT=RQD/RPS.

The above and other scheduling steps will be further explained below in the context of FIGS. 8A through 8D.

Figure 8A:
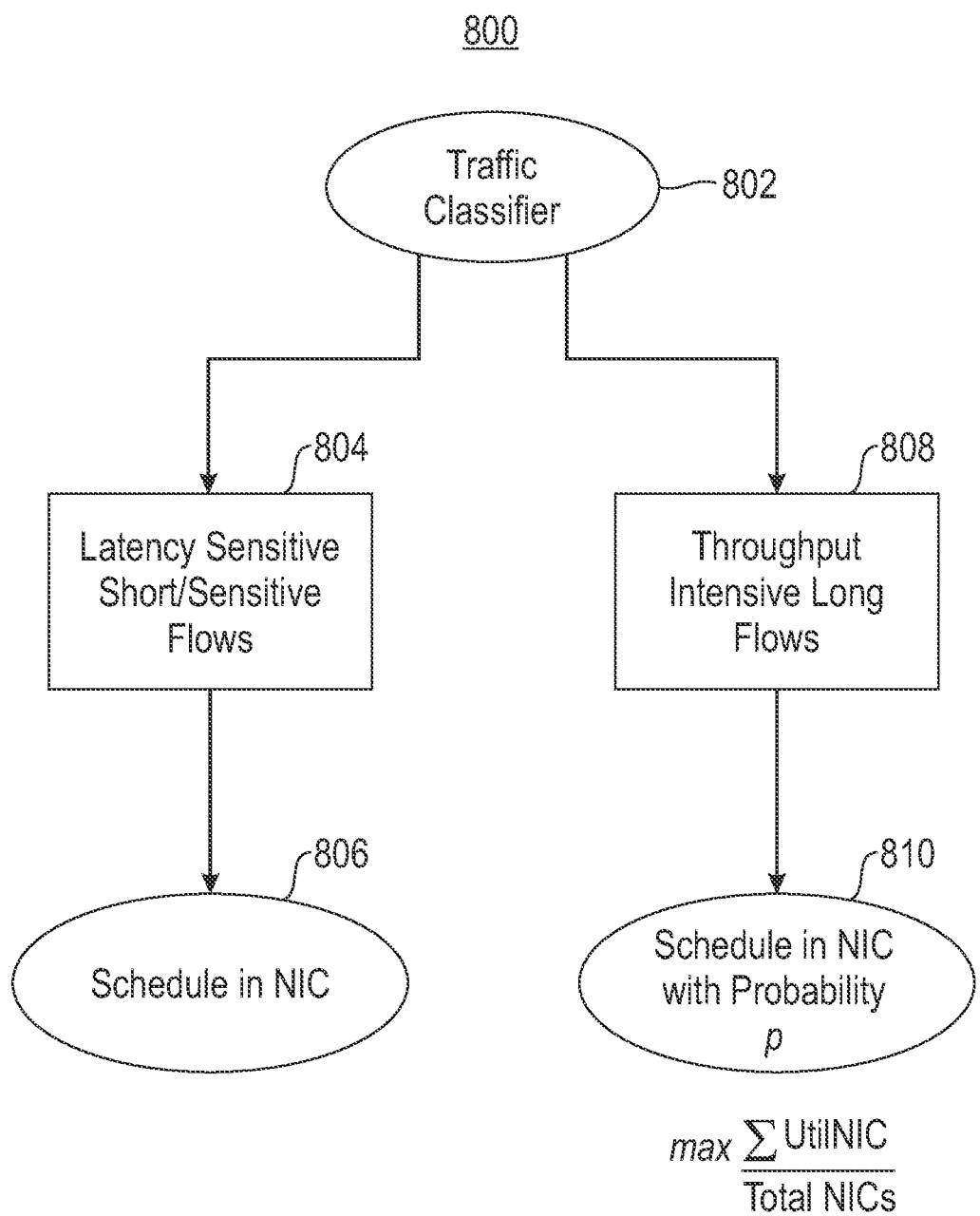

Turning now to FIG. 8A, scheduler agent 316 comprises a traffic classifier algorithm 800 that classifies traffic flows that are part of received requests, according to an illustrative embodiment. As FIG. 8A generally shows, traffic classifier 802 classifies requests into: latency sensitive flows 804 which are scheduled (806) in a NIC; and throughput intensive flows 808 which are scheduled (810) in a NIC with a probability p. More particularly, as will be further explained, latency sensitive flows 804, which can include flows that are one or more of short, bursty, and high priority, are better handled at a NIC. Bursty flows bottleneck network (e.g., PCIe) bandwidth, while short flow latency is affected by network (PCIe) bandwidth. On the other hand, throughput intensive flows 808, which include long flows (relative to short flows), are better handled at a CPU.

In an illustrative embodiment, probability p is considered a tunable parameter (increase/decrease) used by scheduler agent 316 to maximize utilization of NICs 324 of worker nodes 320. For example, one objective as shown in FIG. 8A is to maximize the collective utilization of all NICs. Thus, scheduler agent 316 can increase p by a factor of x based on this objective. If no resources in a NIC are available, then the request can be sent to the CPU for default CPU scheduling. Scheduler agent 316 keeps track of the proportion of sensitive flows that are going to the CPU and, if greater than a given threshold, scheduler agent 316 reduces p by a factor of y.

FIG. 8B illustrates a traffic classifier algorithm 820 that can be used to classify traffic flows associated with requests, as described above, according to an illustrative embodiment. As shown, in this non-limiting example, count-min sketches are used to maintain packet count and temporal information wherein each sketch field contains <pkt_count, timestamp>.

Figure 8C:
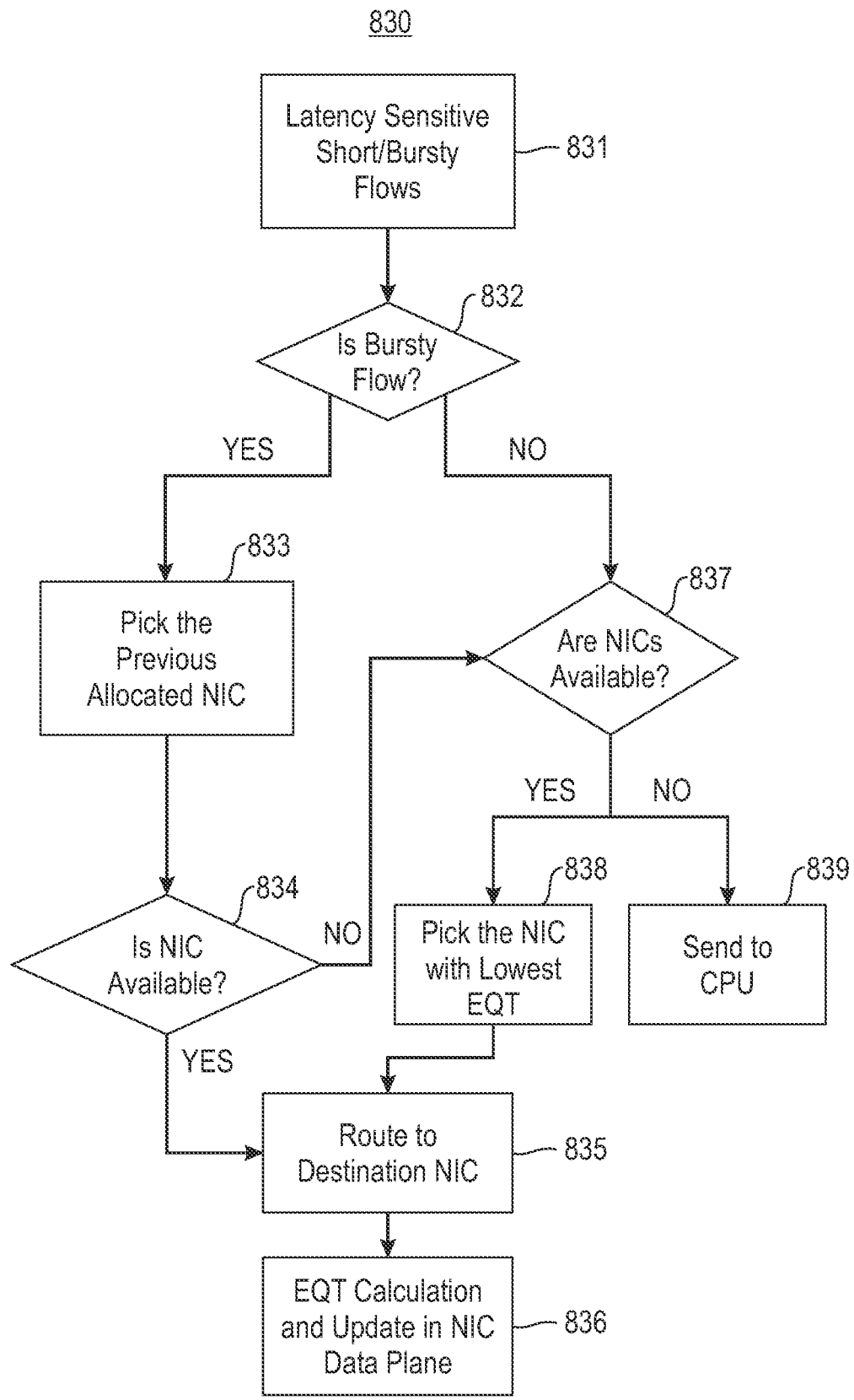

Turning now to FIG. 8C, a scheduling algorithm 830 for latency sensitive flows is depicted, according to an illustrative embodiment. As shown, once a traffic flow of a current request is classified as latency sensitive (e.g., bursty and/or short) in step 831, scheduling algorithm 830 determines whether the flow is bursty in step 832. While FIG. 8C refers to bursty traffic flows, it is to be understood that the same steps are applied for short traffic flows. If yes in step 832, step 833 selects the NIC 324 that was allocated in the previous iteration of scheduling algorithm 830. If the previous NIC 324 is available to handle the current request, as determined in step 834, the current request with corresponding traffic flow is routed to the previous NIC 324 in step 835. The scheduling algorithm 830 updates the EQT calculation, as explained above, for this worker node NIC 324 and records the update in the NIC data plane (i.e., the data plane established across smart-NIC orchestration platform 330 of FIG. 3) in step 836. Scheduler agent 316 can also then re-sort the eligible NIC list based on the updated EQT metric.

If the traffic flow of the current request is not bursty (step 832) or, even if bursty, the previous allocated NIC 324 is not available (step 834), step 837 of scheduling algorithm 830 determines whether there are any (other) NICs 324 available to handle the current request. If yes in step 837, the NIC 324 with the lowest EQT metric is selected in step 838, and the current request is routed to the selected NIC (step 835) and the EQT metric and data plane are updated for the selected NIC (step 836), as explained above. If no other NIC 324 is available in step 837, then the current request and corresponding traffic flow is routed to a CPU 322 of a given worker node 320 for execution (step 839).

Thus, as is evident, scheduling algorithm 830 preferably schedules a bursty/short traffic flow to a worker node NIC 324 for execution as long as one is available, otherwise the traffic flow is scheduled to a worker node CPU 322 for execution. When selecting an available worker node NIC 324, the one with the lowest EQT metric is selected. In some embodiments, scheduler agent 316 maintains a hash-based list of previous NIC allocations in order to allocate the same worker node NIC 324 to a burst of related packets (step 833). Also, advantageously, as explained above (step 836), scheduler agent 316 updates the minimum EQT in the data-plane, while the control-plane updates in regular intervals.

Figure 8D:
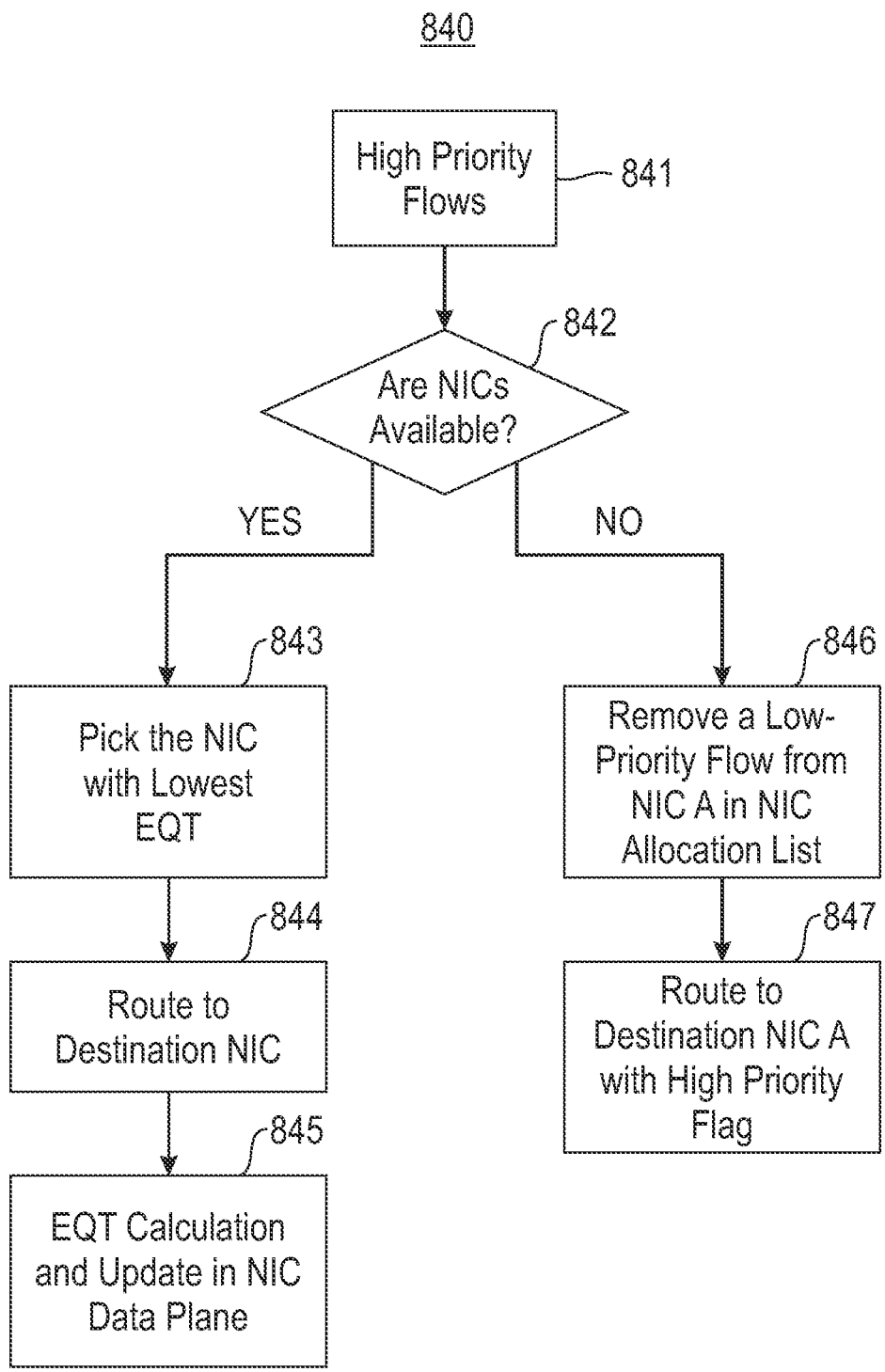

FIG. 8D depicts a scheduling algorithm 840 for high priority flows, according to an illustrative embodiment. As shown, once a traffic flow of a current request is classified as high priority (e.g., based on a predetermined priority criteria established by the users and/or providers of the information processing system) in step 841, scheduling algorithm 840 determines whether any worker node NICs 324 are available in step 842. If yes in step 842, the NIC 324 with the lowest EQT metric is selected in step 843, the current request is routed to the selected NIC in step 844, and the EQT metric and data plane are updated for the selected NIC in step 845, as explained above. However, if no worker node NIC 324 is available (step 842), scheduling algorithm 840 removes a low priority flow assigned to a given worker node NIC 324 (NIC A) in the NIC allocation list in step 846, and routes the current request to NIC A for execution with a high priority flag set in the request in step 847.

In illustrative embodiments, in support of high priority flows, worker node NICs 324 can be configured with an additional queue to meet SLA requirements. Further, in illustrative embodiments, the NIC allocation list mentioned above can be configured to store the priority flag associated with each traffic flow.

Figure 9:
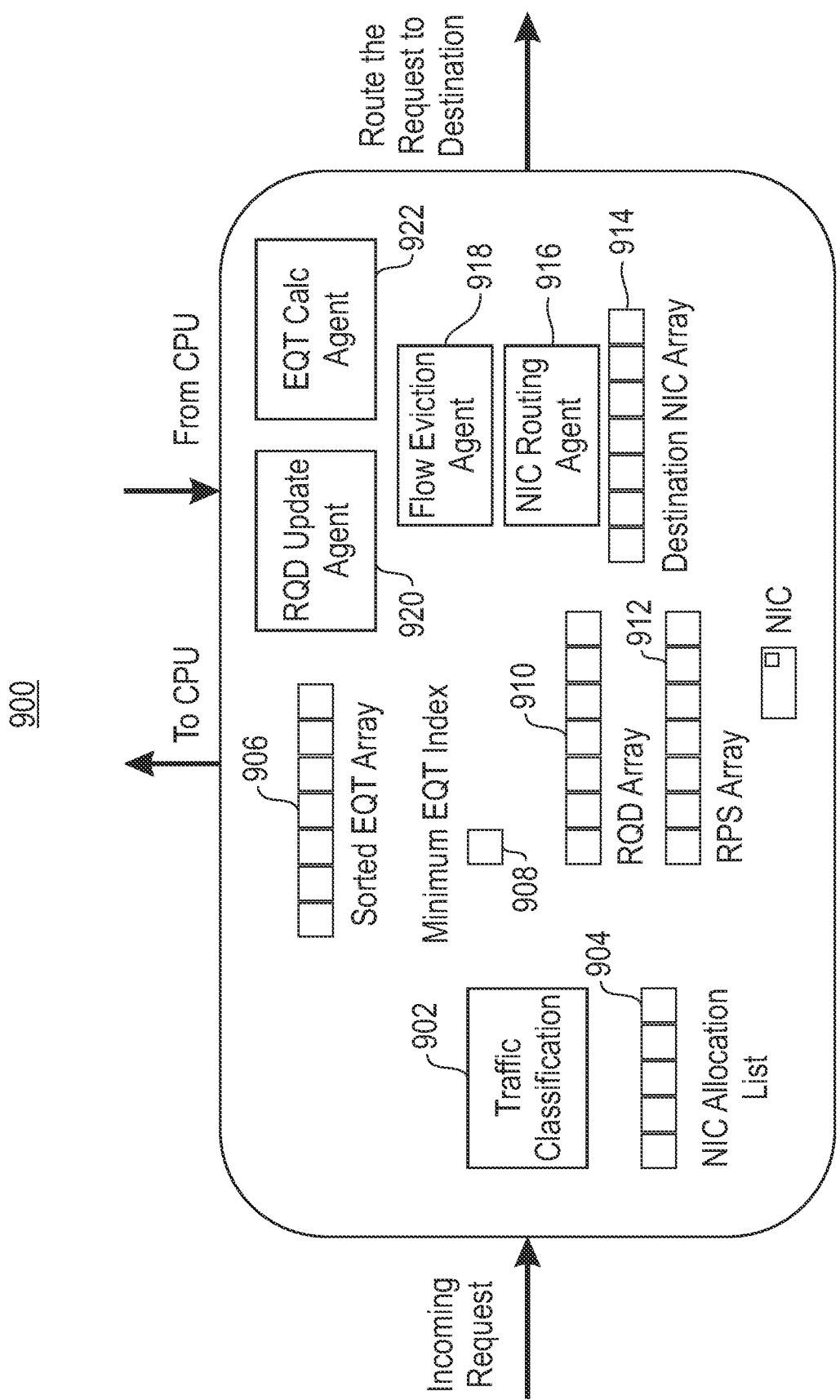
FIG. 9 illustrates a scheduler agent of a network interface controller-based orchestration architecture for managing placement of virtualized workloads according to an illustrative embodiment.

Turning now to FIG. 9, a scheduler agent 900 is depicted according to an illustrative embodiment. It is to be appreciated that scheduler agent 900 is one example of scheduler agent 316 and is configured to implement scheduling steps, mechanisms and/or features described above in the context of FIGS. 7 and 8A-8D. More particularly, as shown, scheduler agent 900 comprises a traffic classification module 902, a NIC allocation list 904, a sorted EQT array 906, a minimum EQT index 908, an RQD array 910, an RPS array 912, a destination NIC array 914, a NIC routing agent 916, a flow eviction agent 918, an RQD update agent 920, and an EQT calculation agent 922. Note that in one illustrative embodiment, scheduler agent 900 can be deployed to execute in a scheduler/ingress controller of a smart-NIC, i.e., scheduler node NIC 314.

As shown, incoming request(s) are first classified, as explained above, by traffic classification module 902. NIC allocation list 904 is the list that tracks which requests are allocated to which worker node NICs, as well as the setting of the priority flag, as explained above. Sorted EQT array 906 stores the EQT calculations for eligible worker node NICs sorted from lowest EQT to highest EQT. Minimum EQT index 908 is used to track the worker node NIC with the lowest EQT metric (e.g., step 838). RQD array 910 and RPS array 912 store the RQD and RPS metrics, respectively, for each worker node NIC. Destination NIC array 914 indicates which worker node NIC is being allocated for current request. NIC routing agent 916 routes the current request to the selected worker node NIC (e.g., step 835), e.g., updates end-host address(es) (e.g., Internet Protocol or IP/Media Access Control or MAC) and updates special Transmission Control Protocol or TCP flags for NIC placements. Flow eviction agent 918 removes, from the NIC allocation list 904, low priority requests allocated to worker node NICs in favor of high priority requests (e.g., step 846). RQD update agent 920 keeps track of the RQD metrics received from worker node NICs, and EQT calculation agent 922 computes the EQT metric (RQD/RPS) and updates the minimum EQT index 908, as explained above. The current request is then routed to the destination NIC.

Advantageously, as explained herein, illustrative embodiments, provide a scheduler that performs placement of the incoming requests for VNFs that are deployed across CPUs and smart-NICs in worker nodes to minimize the overall latency of sensitive and priority traffic. More particularly, a monitoring agent deployed on each worker node smart-NICs reports metrics periodically to the scheduler. A scheduler agent deployed on a scheduler node smart-NIC performs scheduling decisions at line-rate and at scale. Advantageously, illustrative embodiments provide a mechanism to perform placement of flows to smart-NICs to minimize the latency of short, bursty and high priority traffic.

Further advantageously, as explained herein, illustrative embodiments comprise the following computer-implemented methodology. In a processing platform comprising a plurality of nodes, wherein at least one node is configured as a scheduler node and one or more nodes are configured as worker nodes, and wherein each node comprises a processing unit and a network interface controller, a set of usage metrics is computed at each of the one or more worker nodes. The set of usage metrics is collected from each of the one or more worker nodes at the scheduler node. The scheduler node selects, in response to an incoming request, one of the one or more worker nodes to allocate a virtualized workload for execution, wherein the selection utilizes at least a portion of the set of usage metrics collected from each of the one or more worker nodes. The usage metric computing step is performed by a monitoring agent deployed in the network interface controller of each of the one or more worker nodes, and the usage metric collecting step and the worker node selecting step are performed at least partially by a scheduling agent deployed in the network interface controller of the scheduler node.

The techniques depicted in FIGS. 1-9 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIGS. 1-9 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 10:
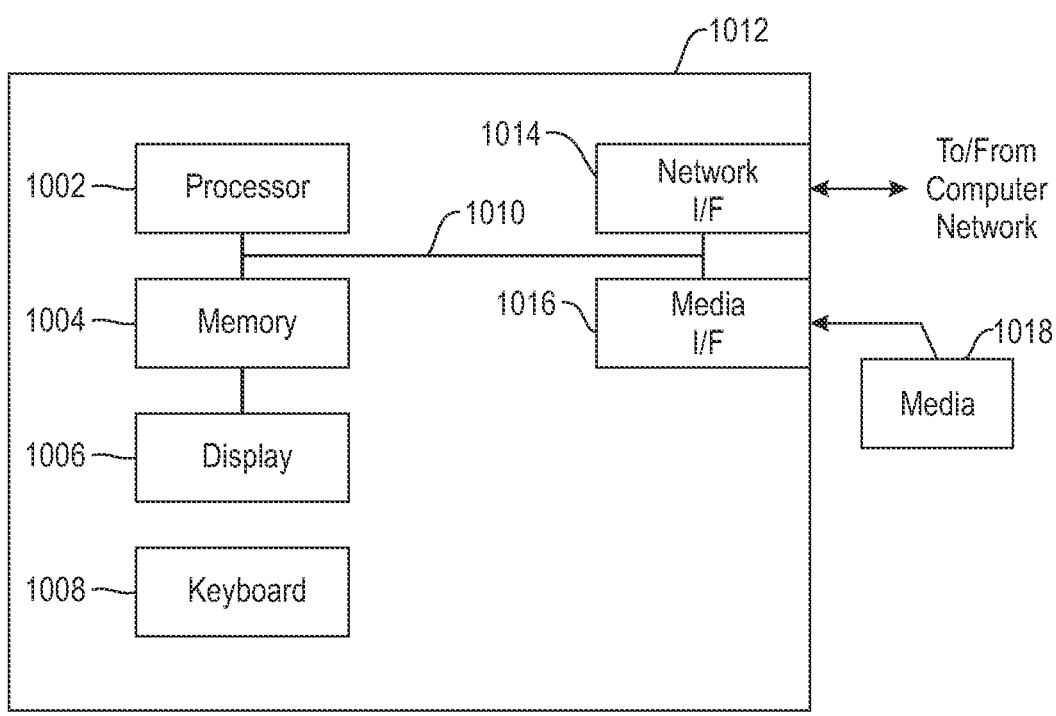
FIG. 10 illustrates an exemplary information processing system according to an illustrative embodiment.

Additionally, an embodiment of the present invention can make use of software running on a computer or workstation. With reference to FIG. 10, such an implementation might employ, for example, a processor 1002, a memory 1004, and an input/output interface formed, for example, by a display 1006 and a keyboard 1008. The term "processor" as used herein is intended to include any processing device, such as, for example, one that includes a multi-core CPU, GPU, FPGA and/or other forms of processing circuitry such as one or more ASICs. Further, the term "processor" may refer to more than one individual processor. The term "memory" is intended to include memory associated with a processor (e.g., CPU, GPU, FPGA, ASIC, etc.) such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 1002, memory 1004, and input/output interface such as display 1006 and keyboard 1008 can be interconnected, for example, via bus 1010 as part of a data processing unit 1012. Suitable interconnections, for example via bus 1010, can also be provided to a network interface 1014, such as a network card, which can be provided to interface with a computer network, and to a media interface 1016, such as a diskette or CD-ROM drive, which can be provided to interface with media 1018.

Accordingly, computer software including instructions or code for performing the methodologies of embodiments of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 1002 coupled directly or indirectly to memory elements 1004 through a system bus 1010. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 1008, displays 1006, pointing devices, and the like) can be coupled to the system either directly (such as via bus 1010) or through intervening I/O controllers (omitted for clarity).

Network adapters such as network interface 1014 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 1012 as shown in FIG. 10) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 1002. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICs), functional circuitry, an appropriately programmed digital computer with associated memory, and the like. Given the teachings of the invention provided herein, one of ordinary skill in the related art will be able to contemplate other implementations of the components of the invention.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 11:
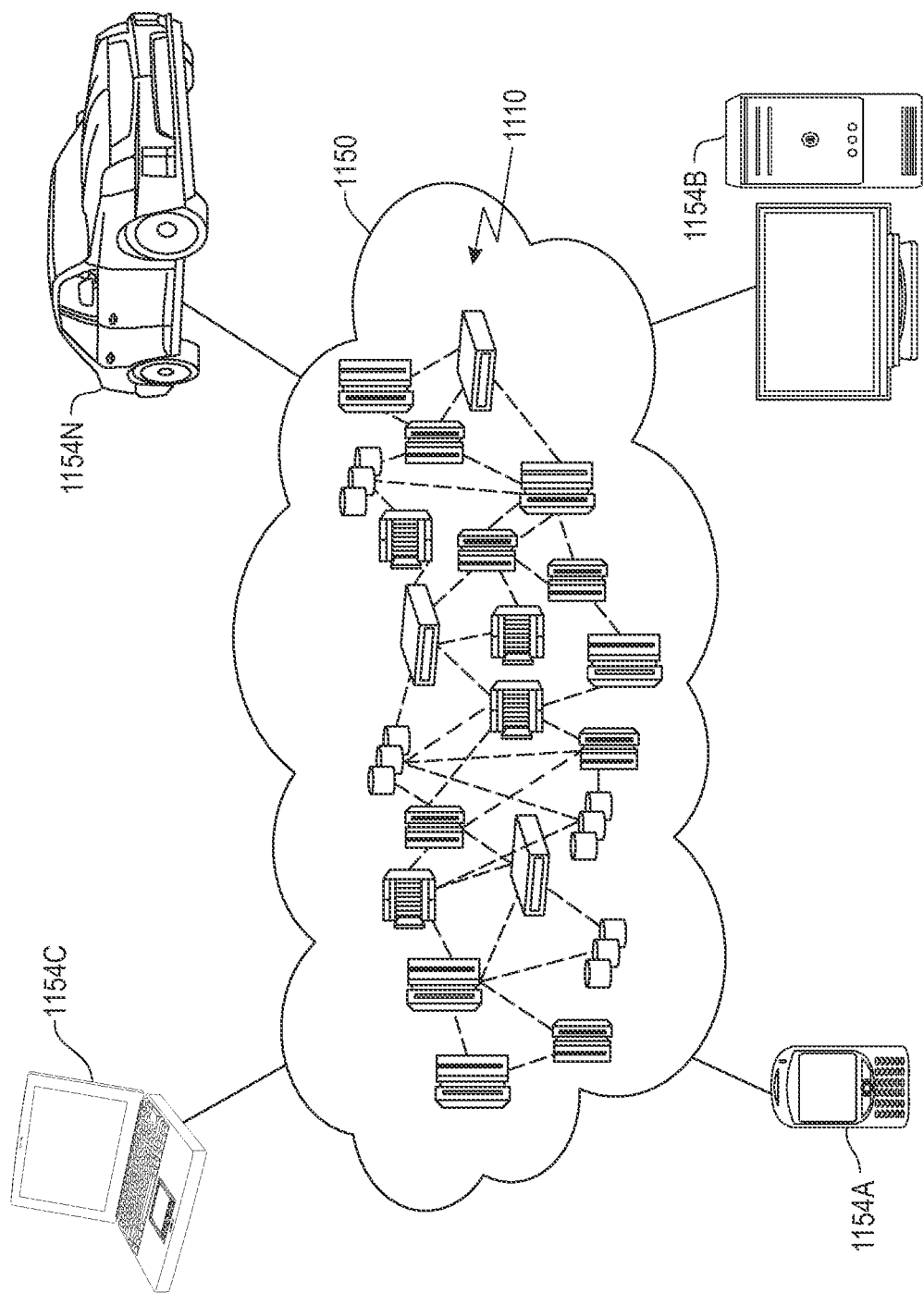
FIG. 11 illustrates a cloud computing environment according to an illustrative embodiment.

Referring now to FIG. 11, illustrative cloud computing environment 1150 is depicted. As shown, cloud computing environment 1150 includes one or more cloud computing nodes 1110 with which local computing devices used by cloud consumers, such as, for example, personal digital assistant (PDA) or cellular telephone 1154A, desktop computer 1154B, laptop computer 1154C, and/or automobile computer system 1154N may communicate. Nodes 1110 may communicate with one another. They may be grouped (not shown) physically or virtually, in one or more networks, such as Private, Community, Public, or Hybrid clouds as described hereinabove, or a combination thereof. This allows cloud computing environment 1150 to offer infrastructure, platforms and/or software as services for which a cloud consumer does not need to maintain resources on a local computing device. It is understood that the types of computing devices 1154A-N shown in FIG. 11 are intended to be illustrative only and that computing nodes 1110 and cloud computing environment 1150 can communicate with any type of computerized device over any type of network and/or network addressable connection (e.g., using a web browser).

Figure 12:
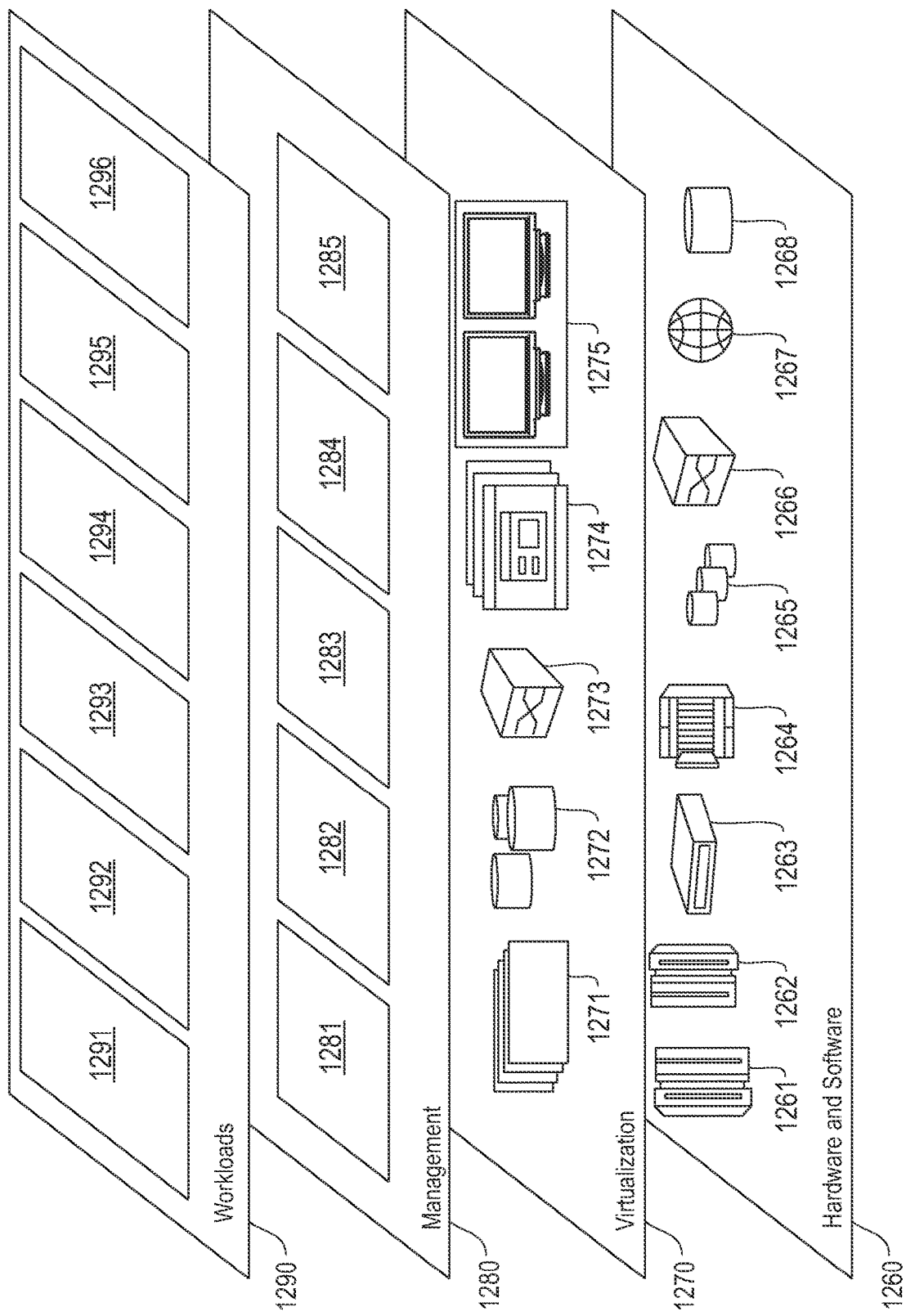
FIG. 12 illustrates abstraction model layers according to an illustrative embodiment.

Referring now to FIG. 12, a set of functional abstraction layers provided by cloud computing environment 1150 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 1260 includes hardware and software components. Examples of hardware components include: mainframes 1261; RISC (Reduced Instruction Set Computer) architecture-based servers 1262; servers 1263; blade servers 1264; storage devices 1265; and networks and networking components 1266. In some embodiments, software components include network application server software 1267 and database software 1268.

Virtualization layer 1270 provides an abstraction layer from which the following examples of virtual entities may be provided: virtual servers 1271; virtual storage 1272; virtual networks 1273, including virtual private networks; virtual applications and operating systems 1274; and virtual clients 1275. In one example, management layer 1280 may provide the functions described below. Resource provisioning 1281 provides dynamic procurement of computing resources and other resources that are utilized to perform tasks within the cloud computing environment. Metering and Pricing 1282 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 1283 provides access to the cloud computing environment for consumers and system administrators. Service level management 1284 provides cloud computing resource allocation and management such that required service levels are met. Service Level Agreement (SLA) planning and fulfillment 1285 provide pre-arrangement for, and procurement of, cloud computing resources for which a future requirement is anticipated in accordance with an SLA.

Workloads layer 1290 provides examples of functionality for which the cloud computing environment may be utilized. Examples of workloads and functions which may be provided from this layer include: mapping and navigation 1291; software development and lifecycle management 1292; virtual classroom education delivery 1293; data analytics processing 1294; transaction processing 1295; and processing 1296 for network interface controller-based placement of virtualized workloads on nodes of an information processing system in accordance with the one or more embodiments of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product comprising a computer readable storage medium having program instructions embodied therewith, the program instructions executable by one or more processors to cause the one or more processors to:
    collect, at a network interface controller associated with a first node, a set of usage metrics of one or more other network interface controllers respectively associated with one or more other nodes;
    select, at the network interface controller associated with the first node, one of the one or more other nodes to allocate a virtualized workload for execution, wherein the selection utilizes at least a portion of the set of usage metrics collected from each of the one or more other network interface controllers; and
    cause the virtualized workload to be executed by the selected node;
    wherein the usage metric collection and the node selection are performed at least partially by a scheduling agent deployed in the network interface controller of the first node;
    wherein the network interface controller associated with the first node is part of a network interface controller orchestration platform with the one or more other network interface controllers respectively associated with the one or more other nodes; and
    wherein the set of usage metrics are collected by the scheduling agent from a monitoring agent deployed in the network interface controller of each of the one or more other nodes.

2. The computer program product of claim 1, wherein the set of usage metrics comprise a request queue depth metric, a requests per second metric, and a memory used by states metric.

3. The computer program product of claim 1, wherein the node selection is based on an estimated queueing time metric computed from at least a portion of the set of usage metrics.

4. The computer program product of claim 3, wherein the node with the lowest estimated queueing time metric is selected as the node to allocate the virtualized workload for execution.

5. The computer program product of claim 1, wherein the node selection comprises a classification of a traffic flow associated with the virtualized workload.

6. The computer program product of claim 5, wherein the classification of the traffic flow comprises classifying the traffic flow as one of a latency sensitive traffic flow and a throughput sensitive traffic flow.

7. The computer program product of claim 5, wherein the node selection further determines whether the virtualized workload is to be executed by the network interface controller or a processing unit of the selected node.

8. The computer program product of claim 7, wherein determining whether the virtualized workload is to be executed by the network interface controller or the processing unit of the selected node is based at least in part on the traffic flow classification.

9. The computer program product of claim 7, wherein determining whether the virtualized workload is to be executed by the network interface controller or the processing unit of the selected node maximizes a probability parameter of selection of the network interface controller.

10. The computer program product of claim 9, wherein the probability parameter of selection of the network interface controller is adjustable.

11. The computer program product of claim 1, wherein the node selection comprises determining a priority of a traffic flow associated with the virtualized workload.

12. The computer program product of claim 11, wherein the node selection further comprises, upon determining that the traffic flow of the virtualized workload is a high priority traffic flow, removing a previously allocated traffic flow with a lower priority from a given node, and allocating the high priority traffic flow to the given node.

13. The computer program product of claim 1, wherein the virtualized workload is associated with a network function of a telecommunications network.

14. The computer program product of claim 1, wherein the one or more processors are part of a cloud computing architecture.

15. A computer-implemented method, comprising:
collecting, at a network interface controller associated with a first node, a set of usage metrics of one or more other network interface controllers respectively associated with one or more other nodes;
selecting, at the network interface controller associated with the first node, one of the one or more other nodes to allocate a virtualized workload for execution, wherein the selection utilizes at least a portion of the set of usage metrics collected from each of the one or more other network interface controllers; and
causing the virtualized workload to be executed by the selected node;
wherein the usage metric collection and the node selection are performed at least partially by a scheduling agent deployed in the network interface controller of the first node;
wherein the network interface controller associated with the first node is part of a network interface controller orchestration platform with the one or more other network interface controllers respectively associated with the one or more other nodes;
wherein the set of usage metrics are collected by the scheduling agent from a monitoring agent deployed in the network interface controller of each of the one or more other nodes; and
wherein the computer-implemented method is performed by at least one processing device comprising a processor coupled to a memory when executing program code.

16. An apparatus, comprising:
at least one processing device comprising a processor coupled to a memory, the at least one processing device, when executing program code, is configured to:
collect, at a network interface controller associated with a first node, a set of usage metrics of one or more other network interface controllers respectively associated with one or more other nodes;
select, at the network interface controller associated with the first node, one of the one or more other nodes to allocate a virtualized workload for execution, wherein the selection utilizes at least a portion of the set of usage metrics collected from each of the one or more other network interface controllers; and
cause the virtualized workload to be executed by the selected node;
wherein the usage metric collection and the node selection are performed at least partially by a scheduling agent deployed in the network interface controller of the first node;
wherein the network interface controller associated with the first node is part of a network interface controller orchestration platform with the one or more other network interface controllers respectively associated with the one or more other nodes; and
wherein the set of usage metrics are collected by the scheduling agent from a monitoring agent deployed in the network interface controller of each of the one or more other nodes.

17. The apparatus of claim 16, wherein the node selection comprises one or more of a classification of a traffic flow associated with the virtualized workload and determining a priority of a traffic flow associated with the virtualized workload.

18. The apparatus of claim 17, wherein the classification of the traffic flow comprises classifying the traffic flow as one of a latency sensitive traffic flow and a throughput sensitive traffic flow.

19. The computer-implemented method of claim 15, wherein the node selection comprises one or more of a classification of a traffic flow associated with the virtualized workload and determining a priority of a traffic flow associated with the virtualized workload.

20. The computer-implemented method of claim 19, wherein the classification of the traffic flow comprises classifying the traffic flow as one of a latency sensitive traffic flow and a throughput sensitive traffic flow.

* * * * *